United States Patent
Spinella

(10) Patent No.: US 11,108,269 B2
(45) Date of Patent: Aug. 31, 2021

(54) SYSTEM FOR TRANSFERRING ENERGY AND EXCHANGING DATA BETWEEN ELECTRONIC DEVICES

(71) Applicant: EGGTRONIC ENGINEERING S.P.A., Modena (IT)

(72) Inventor: Igor Spinella, Modena (IT)

(73) Assignee: EGGTRONIC ENGINEERING S.R.L., Modena (IT)

( * ) Notice: Subject to any disclaimer, the term of this patent is extended or adjusted under 35 U.S.C. 154(b) by 0 days.

(21) Appl. No.: 15/734,428

(22) PCT Filed: Jun. 5, 2019

(86) PCT No.: PCT/IB2019/054668
§ 371 (c)(1),
(2) Date: Dec. 2, 2020

(87) PCT Pub. No.: WO2020/003027
PCT Pub. Date: Jan. 2, 2020

(65) Prior Publication Data
US 2021/0226477 A1    Jul. 22, 2021

(30) Foreign Application Priority Data

Jun. 25, 2018   (IT) .................. 102018000006612

(51) Int. Cl.
*H02J 7/00* (2006.01)
*H02J 50/10* (2016.01)
(Continued)

(52) U.S. Cl.
CPC .............. *H02J 50/10* (2016.02); *H02J 50/05* (2016.02); *H02J 50/70* (2016.02); *H02J 50/80* (2016.02); *H04B 5/0031* (2013.01); *H04B 5/0037* (2013.01)

(58) Field of Classification Search
CPC .. H02J 50/10; H02J 50/05; H02J 50/70; H02J 50/80; H04B 5/0031; H04B 5/0037
(Continued)

(56) References Cited

U.S. PATENT DOCUMENTS

| 5,451,763 A | 9/1995 | Pickett et al. |
| 2003/0091118 A1* | 5/2003 | Lohr ....................... H01F 38/14 |
| | | 375/258 |

(Continued)

FOREIGN PATENT DOCUMENTS

| DE | 4436592 A1 | 4/1996 |
| DE | 19705301 C1 | 10/1998 |

(Continued)

*Primary Examiner* — Zixuan Zhou
(74) *Attorney, Agent, or Firm* — Browdy and Neimark, PLLC

(57) ABSTRACT

A system (1) for transferring electric energy and data is proposed, comprising a primary circuit (10) and a secondary circuit (20). The primary circuit (10) comprises: an electric energy source module (11); a primary inductive element (12) connected to the source module (11); a primary transceiver module (13) configured to encode data into electromagnetic signals and decode electromagnetic signals into data, and a pair of electrically conductive primary transceiving armatures (14*a*, 14*b*) connected to the primary transceiver modules (13). The secondary circuit (20) comprises: an electric energy conversion module (21); a secondary inductive element (22) connected to the conversion module (21); a secondary transceiver module (23) configured to encode data into electromagnetic signals and decode electromagnetic signals into data, and a pair of electrically conductive secondary transceiving armatures (24*a*, 24*b*) connected to the secondary transceiver module (23). The primary inductive element (12) and the secondary inductive element (22) are configured to be mutually coupled inductively, allowing a transfer of electric energy from the source module (11) to (Continued)

the conversion module (21). Moreover, each primary transceiving armature (14a, 14b) is configured to be coupled capacitively to a respective secondary transceiving armature (24a, 24b), allowing an exchange of data between the primary transceiver module (13) and the secondary transceiver module (23).

10 Claims, 9 Drawing Sheets

(51) Int. Cl.
     *H02J 50/70*    (2016.01)
     *H02J 50/80*    (2016.01)
     *H02J 50/05*    (2016.01)
     *H04B 5/00*    (2006.01)
(58) Field of Classification Search
     USPC .......................................... 320/108; 307/104
     See application file for complete search history.

(56) References Cited

U.S. PATENT DOCUMENTS

| | | | |
|---|---|---|---|
| 2007/0159329 A1* | 7/2007 | Silverman | G11B 20/00275 |
| | | | 340/572.1 |
| 2015/0102686 A1* | 4/2015 | Washiro | H02J 50/90 |
| | | | 307/104 |
| 2017/0141616 A1 | 5/2017 | Habraken et al. | |
| 2018/0239040 A1* | 8/2018 | Adams | G01V 1/22 |

FOREIGN PATENT DOCUMENTS

| | | | | |
|---|---|---|---|---|
| EP | 2555378 A1 | 2/2013 | | |
| EP | 3182555 A1 | 6/2017 | | |
| WO | WO-2017025833 A1 * | 2/2017 | ............. | H02J 50/05 |
| WO | 2017037264 A1 | 3/2017 | | |

* cited by examiner

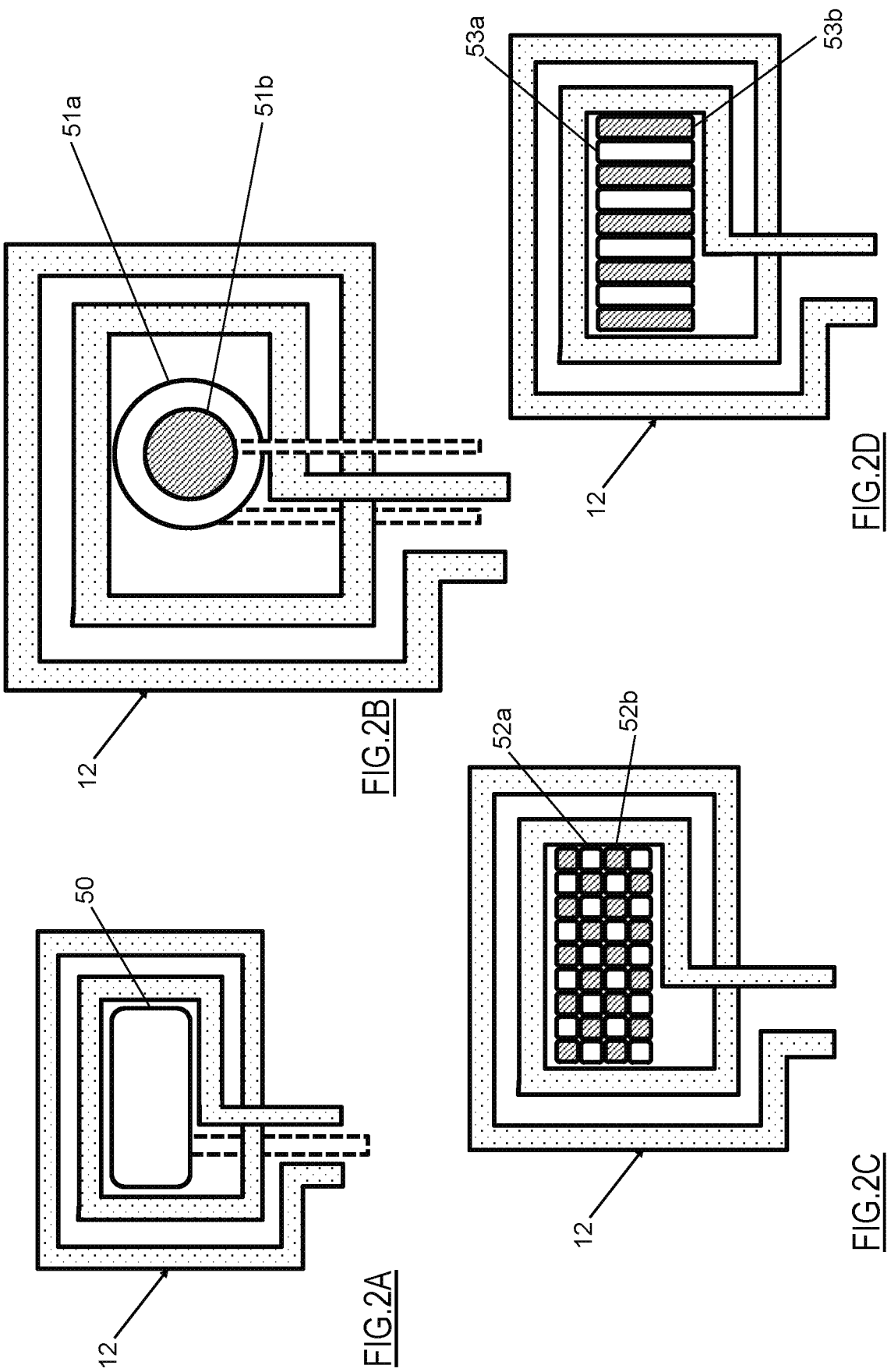

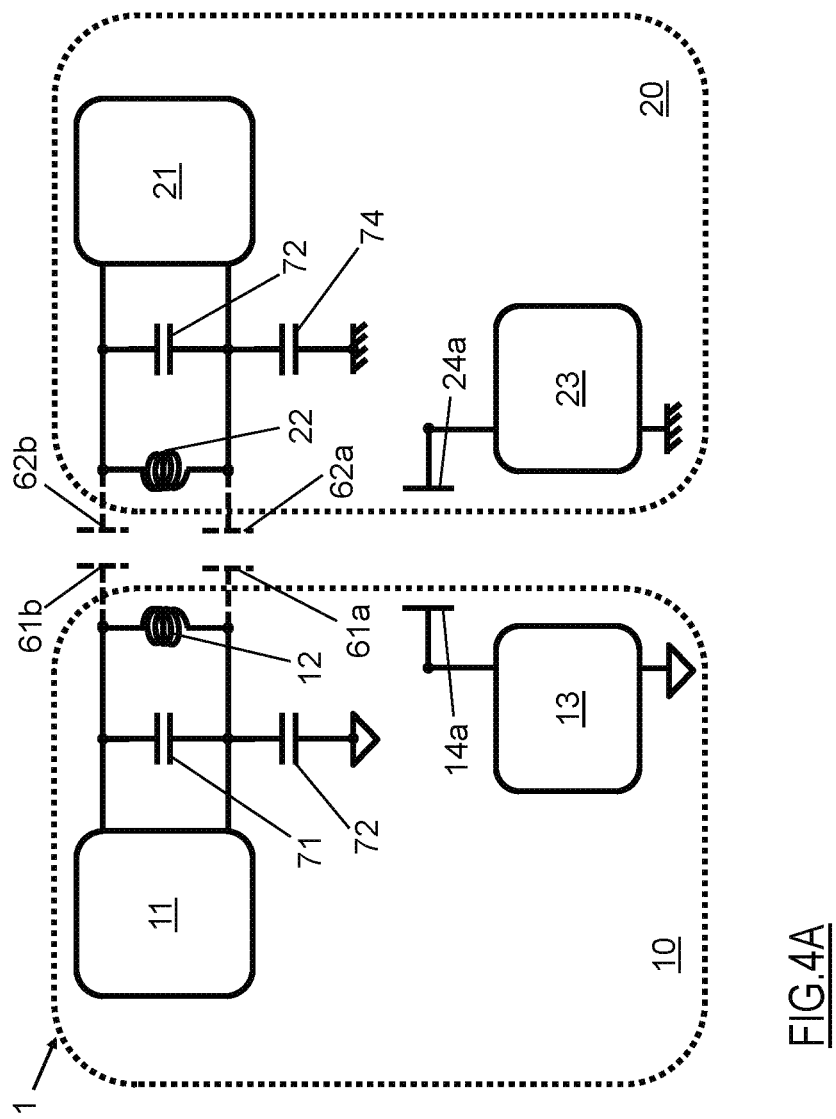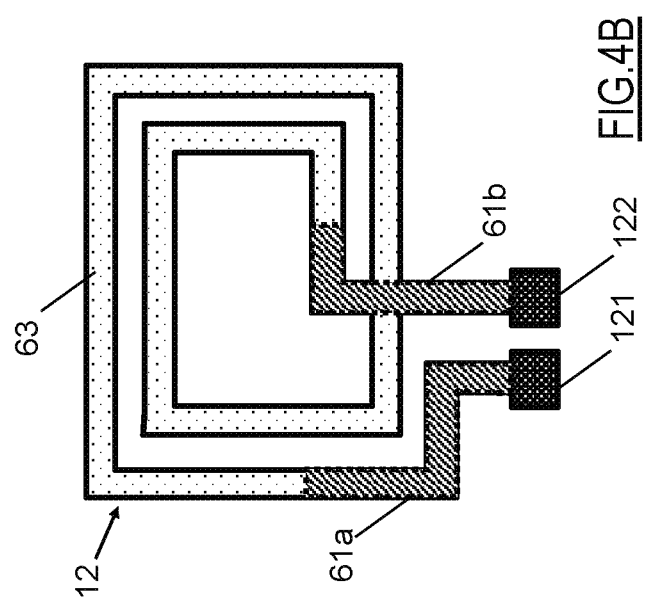

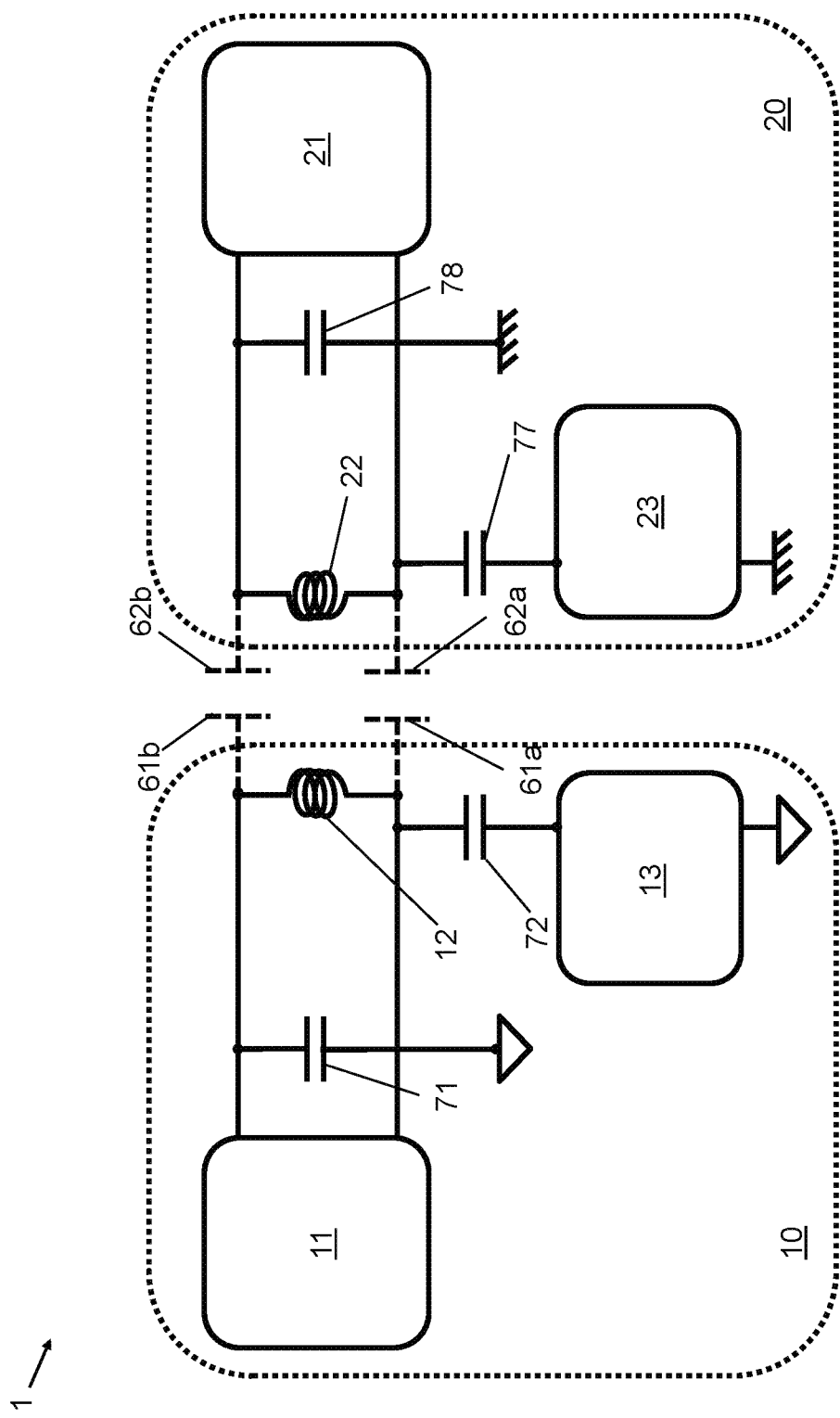

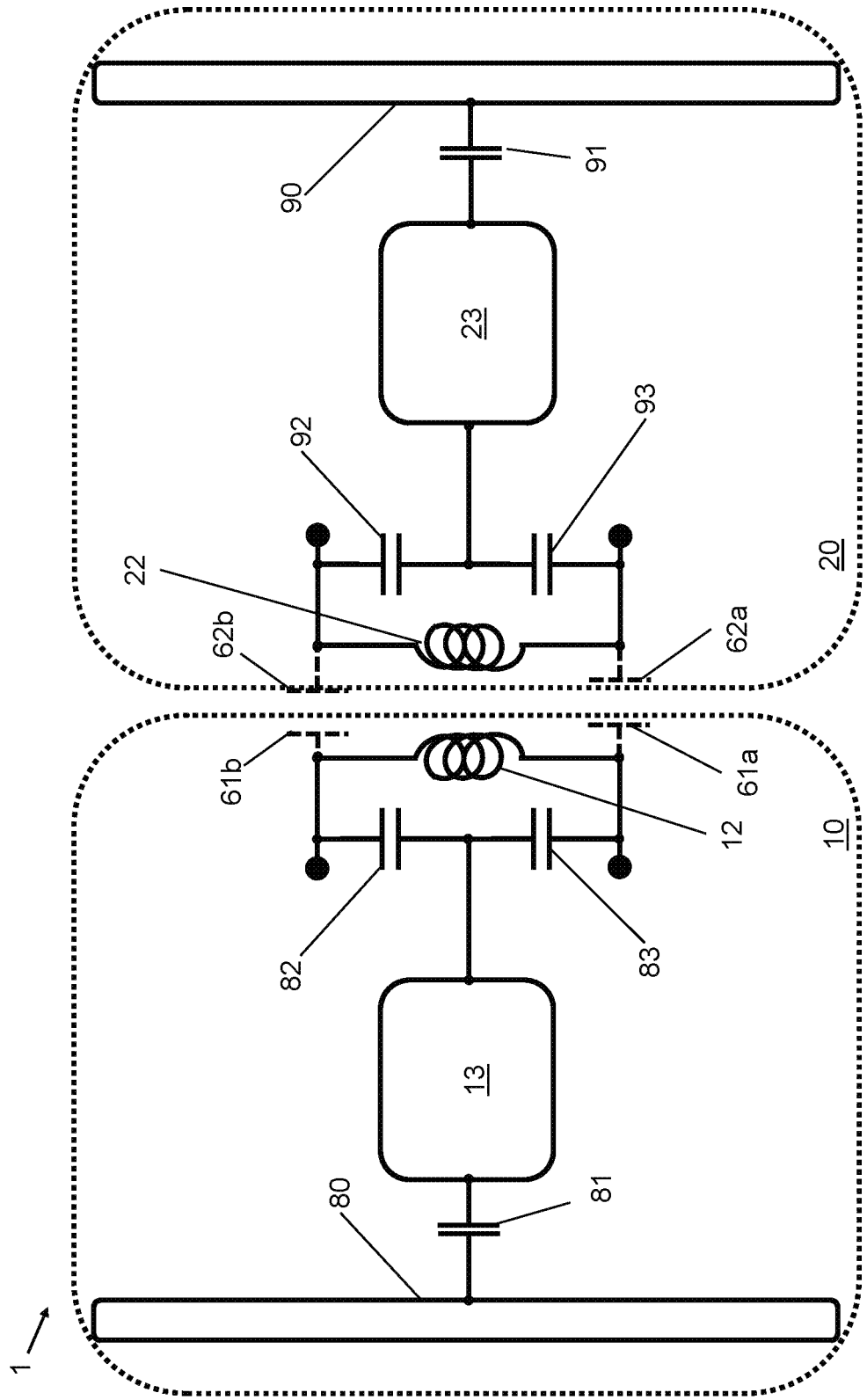

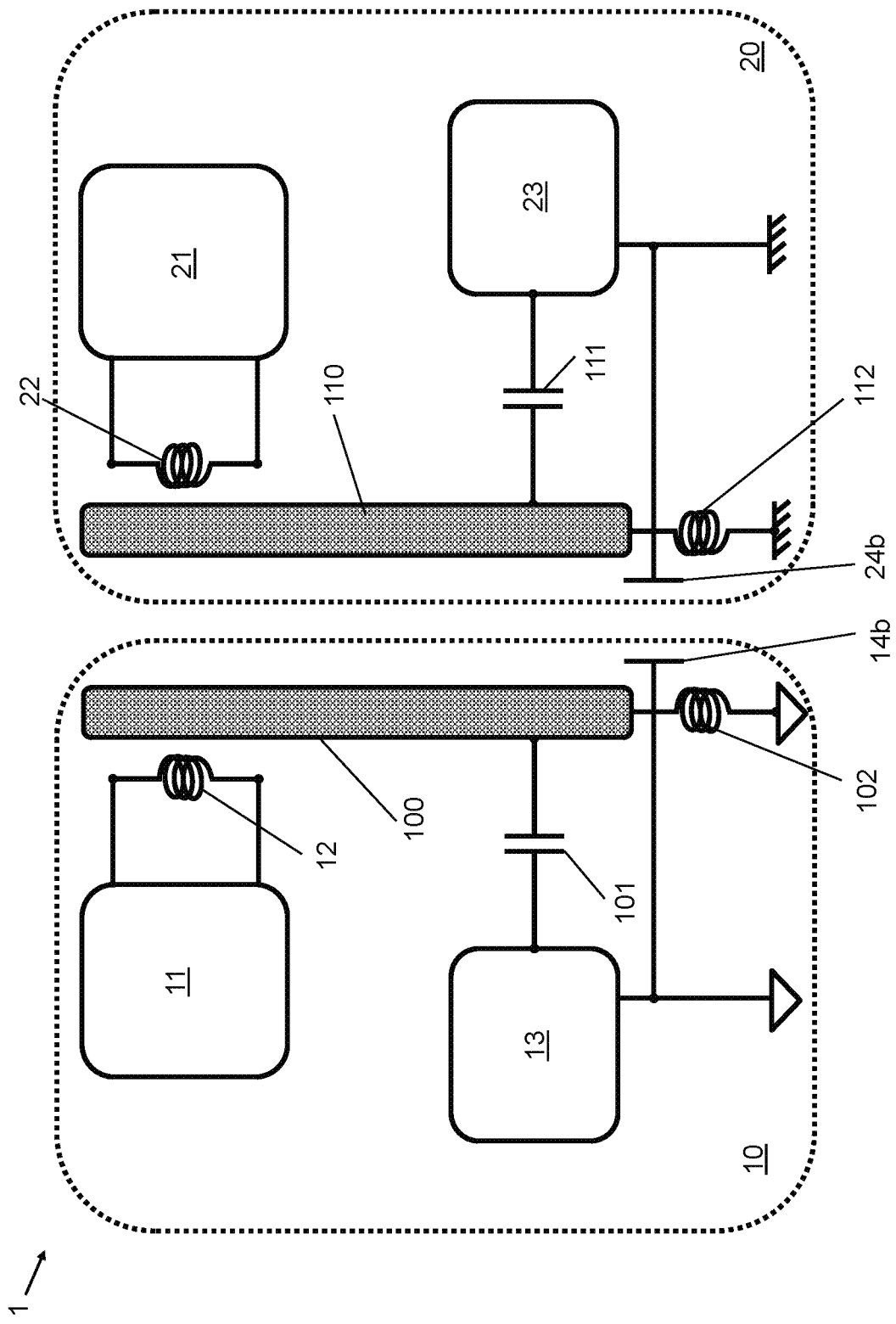

SYSTEM FOR TRANSFERRING ENERGY AND EXCHANGING DATA BETWEEN ELECTRONIC DEVICES

TECHNICAL FIELD

The present invention relates to the sector of electronics. More in particular, solutions in accordance with embodiments of the present invention refer to systems for transferring energy between devices without electrical contact, or wireless, with functionalities adapted to allow also an exchange of data between such devices.

PRIOR ART

The widespread use of portable and stationary electronic devices has led to the growing need for energy transferring systems that allow them to be powered or recharged rapidly, reliably and practically. Among the possible power supply modes, a particularly convenient and versatile one is wireless power supply, which does not need a physical electrical connection to transfer energy from a source to a user device. In addition, the number of these devices, used in product or process industries, in vehicles, or manufactured directly in the form of consumer goods in the possession of a single user or group of users and the growing tendency to data sharing and interfacing between electronic devices' also because of the development of IoT technology—has led to a wide development of systems for the wireless exchange of data between electronic devices with different technologies and different purposes.

For example, devices that may need to receive electric energy and/or exchange data comprise devices for the consumer market such as cellular phones, smartphones, tablets, fixed and laptop computers, archiving systems, NAS, modems, routers, switches, access points, pointing systems, keyboards, e-book readers, video cameras, photo cameras, satellite navigators, traditional or smart television sets, readers of optical or magnetic devices, etc. Devices such as electrical appliances, thermostats, lighting systems and more generally home automation systems also can need or benefit from a wireless energy transfer and data exchange. Similarly, specific equipment, such as sensors and actuators located in hostile environments in industrial apparatuses or in vehicles—for example sensors of pressure, of temperature, of acceleration, deformation, buttons, screens, etc. —, as well as biomedical apparatuses—for example pacemakers, infusers, implantable defibrillators, etc.—can obtain improved performance, functionality and efficiency implementing wireless systems for transferring energy and exchanging data.

The transfer of electric power through wireless energy transmission systems is known in the art. These systems are typically based on the inductive or capacitive coupling between a primary—or transmission—circuit and a secondary—or reception—circuit, with the primary circuit integrated in a power supply or battery based device and the secondary circuit integrated in a user device to be powered/recharged, which is separate and independent from the power supply device.

Concerning the exchange of data, the solutions typically implemented in known systems exploit radiofrequency wireless connections (for example, Wi-Fi, Bluetooth, RF, NFC, RFID, Zigbee, UWB, CWUSB, WiMAX or others), with different performance in terms of distance covered, cost, consumption and bandwidth. However, these solutions require a circuit portion adapted to transceiving according to the selected transmission standard, that is additional with respect to the circuit portion dedicated to the wireless transfer of power. Moreover, the implemented information transfer can be subject to interference or interfere with the simultaneous transfer of electric energy.

Other known solutions employ wireless energy transmission systems, in particular those based on inductive coupling, to exchange data simultaneously with the transfer of energy or at times when energy transfer does not take place, exploiting the inductive circuit both for the transfer of power and for the transfer of data. Known methodologies for exchanging data by means of inductive coupling consist of frequency modulation of the power carrier—also known as frequency shifting—useful in particular for transmitting data from the power transmission system to the reception system, and in the amplitude modulation obtained by means of changes in the apparent load, connecting and disconnecting, as a function of the bits to be transmitted, loads—typically capacitive or resistive—arranged in parallel to the power load or to the power conversion stage, this technique being particularly useful for transmitting data from the secondary circuit to the primary circuit.

In this way, it is possible to transfer simple information, i.e. a limited quantity of data in a unit of time, for example, information on state of charge and/or power supply, identification number(s) of the devices included in the system, information to start/interrupt/regulate the charge and/or the power supply. It is also possible to exchange more complex information such as user data transferred from secondary to primary and vice versa, useful for example to make data backup copies, identifications, exchanges of multimedia contents, payments, to send messages, to make software updates, etcetera.

One of the main drawbacks of these known systems is given mostly by the dimensioning of the transmission and/or reception inductances. To transmit sufficient power at typical operating frequencies, these elements have a high inductive value, which entails an extremely reduced associated bandwidth, which is reflected in low data exchange performance (i.e. particularly low bit rates, often lower than a few kbps). These results in a particularly penalising disadvantage in the case of transfers of user data of large dimensions—in general, in the order of MB or GB—which require long or impractical times.

A purpose of the present invention is to overcome the aforementioned drawbacks of the prior art, within a simple, rational, low-cost solution, while maintaining its advantages relating to a proximity data exchange.

In particular, a purpose of the present invention is to provide a system able to transfer energy and to exchange data concurrently and independently.

These purposes are achieved by the features of the invention set forth in the independent claim. The dependent claims outline preferred and/or particularly advantageous aspects of the invention.

DESCRIPTION OF THE INVENTION

The invention makes available a system for transferring of electric energy and data comprising a primary circuit and a secondary circuit. The primary circuit comprises: an electric energy source module; a primary inductive element connected to the source module; a primary transceiver module configured to encode data into electromagnetic signals and to decode electromagnetic signals into data, and a pair of (electrically conductive) primary transceiving armatures connected to the primary transceiver module. The secondary circuit comprises: an electric energy conversion module; a secondary inductive element connected to the conversion module; a secondary transceiver module configured to encode data into electromagnetic signals and to decode electromagnetic signals into data, and a pair of (electrically conductive) secondary transceiving armatures connected to the secondary transceiver module. The primary inductive element and the secondary inductive element are configured to couple inductively to each other, allowing electric energy to be transferred from the source module to the conversion module. Moreover, each pair of primary transceiving armatures is configured to be coupled capacitively to a respective pair of secondary transceiving armature, allowing an exchange of data between the primary transceiver module and the secondary transceiver module.

Thanks to this solution, it is possible to transfer energy from the primary circuit to the secondary circuit and at the same time to exchange data in both directions through two distinct and mutually independent physical channels, economically and efficiently. Moreover, the energy transfer and the data exchange can be optimised without negatively influencing each other. In particular, the size of the bandwidth for the capacitive exchange of data can be set substantially at will by virtue of the physical properties of the capacitive channel, without compromising the efficiency of the energy transfer and without changes to existing standards.

In an embodiment, at least a first primary transceiving armature is defined by a primary circuit portion, and at least one corresponding first secondary transceiving armature is defined by a secondary circuit portion. Preferably, said primary circuit portion and said secondary circuit portion are configured to couple to each other defining a capacitor with predetermined capacity.

In this way, it is possible to obtain a capacitor of desired capacity using portions of the primary and secondary circuits that already have a main function. This then makes it possible to obtain a capacitive data transfer with a system having a compact structure and use of a limited number of components.

In an embodiment, each of said primary inductive element and secondary inductive element comprises a pair of connection terminals. Preferably, said primary circuit portion comprises a portion of the primary inductive element that is proximal to one of the connection terminals of said primary inductive element. Moreover, said secondary circuit portion comprises a portion of the secondary inductive element that is proximal to one of the connection terminals of said secondary inductive element.

In this way it is possible to obtain a particularly compact structure. In particular, both inductive and capacity coupling takes place approaching to each other only one respective portion of the primary circuit and of the secondary circuit.

In an embodiment, the primary transceiver module is connected to a connection terminal of the primary transceiver module and the secondary transceiver module is connected to a connection terminal of the secondary inductive element.

Thanks to this solution it is possible to use the inductive element of each circuit also for the capacitive data exchange and independently of the inductive transmission of energy by means of a simple circuit layout.

In an embodiment, said primary circuit portion comprises a portion of a first casing that houses the primary circuit and said secondary circuit portion comprises a portion of a second casing that houses the secondary circuit. Advantageously, said portions of the first and of the second casing are made of conductive material.

Additionally or alternatively, the primary circuit portion comprises an element for shielding the electromagnetic interference of the primary circuit and said secondary circuit portion comprises an element for shielding the electromagnetic interference of the secondary circuit.

Additionally or alternatively, the primary circuit portion comprises a ground plane of the primary circuit and the secondary circuit portion comprises a ground plane of the secondary circuit.

As a further addition or alternative, one between the primary circuit portion and the secondary circuit portion comprises a shielding interposed between the primary inductive element and the secondary inductive element.

Thanks to these solutions, it is possible to use one or more structural/circuit elements of the primary circuit and of the secondary circuit and/or of the respective devices that contain them as armature—or portion of armature—to effect a capacitive connection to allow the exchange of data.

In an embodiment, a second primary transceiving armature is defined by an additional primary circuit portion, and a second secondary transceiving armature is defined by an additional secondary circuit portion. Preferably, the additional primary circuit portion and the additional secondary circuit portion are configured to interact with each other defining an additional capacitor with predetermined capacity.

In this way it is possible to provide both the primary and secondary circuits of a pair of armature distinct from each other and adapted to effect a capacitive coupling that allows an efficient exchange of data between these circuits.

In an embodiment, at least one primary transceiving armature comprises a conductive element positioned inside a region delimited by the primary inductive element and at least one secondary transceiving armature comprises a conductive element positioned inside a region delimited by the secondary inductive element.

Preferably but not necessarily, in this embodiment each primary and secondary inductive element and can be formed by a planar structure and, similarly, that the conductive elements of said at least one primary transceiving armature and of said at least one secondary transceiving armature can also be planar.

This solution makes it possible to provide the system with dedicated armatures for extremely compact and efficient capacitive coupling.

In an embodiment, each primary transceiving armature comprises a respective conductive element, for example planar, positioned inside the region delimited by the primary inductive element and each secondary transceiving armature comprises a respective conductive element, for example planar, positioned inside the region delimited by the secondary inductive element.

In this way, a still more compact structure than in the previous case is obtained.

In an embodiment, each primary and secondary transceiving armature comprises one or more conductive elements, for example planar, positioned according to an arrangement selected from: concentric; checkerboard and side by side.

Thanks to this solution, a capacitive coupling is obtained that has ample rotational or translational freedom, i.e. substantially independent of a relative orientation between the primary circuit and the secondary circuit.

In an embodiment, each conductive element, for example planar, has an open loop shape.

Thanks to this solution it is possible to eliminate, or at the limit to minimise, parasitic currents due to the effect of the magnetic field that permeates these planar conductive elements, improving the performance of the system.

In an embodiment, in the case of conductive elements, for example planar, arranged in a concentric, checkerboard, side by side manner, with open loops and in other arranges that combine these elements, each conductive element, for example planar, can be manufactured economically with standard printed circuit board production techniques that allow to obtain thickness of the order of tenths or hundredths of a millimetre.

These dimensions make it possible to obtain capacitive armatures and inductive elements such as to assure capacitive and inductive couplings, respectively, that are efficient and at the same time able to eliminate, or at least to attenuate, the emergence of negative parasitic effects due to the interaction between the power and the data component.

An additional aspect of the invention makes available a system according to any of the preceding claims, wherein the primary circuit is incorporate in a first electronic device and the secondary circuit is incorporated in a second electronic device. Preferably, the second electronic device is separate and movable with respect to the first electronic device.

In an embodiment, the first electronic device comprises at least one primary processing module connected to the primary transceiver module and configured to exchange data in binary format therewith. Moreover, the second electronic device comprises a secondary processing module connected to the secondary transceiver module and configured to exchange data in binary format therewith.

In this way, the system makes it possible to transmit data processed by the processing module in a fast and reliable manner.

In an embodiment, the first device comprises a primary communication channel connected to the primary transceiver module to exchange therewith data encoded according to the standard of the communication channel. Moreover, the second electronic device comprises a secondary communication channel connected to the primary transceiver module to exchange therewith data encoded according to the standard of the communication channel. Advantageously, the primary communication channel and the secondary communication channel belonging to a same technology selected from: USB, I2C, SPI, PCI Express, HDMI, Display Port, Ethernet, CAN, LIN, Flexray or other standard communication bus.

Thanks to this solution, data transmission through the capacitive coupling creates a virtual wiring that connects the two portions of communication channel provided in mutually distinct and independent electronic devices.

A different aspect of the present invention relates to a method for full duplex data exchange through the aforesaid system. In particular, the method comprises: receiving, at the primary transmission module or at the secondary transceiving module, a first binary datum to be transmitted to the secondary transmission module or to the primary transceiving module, respectively; receiving, at the primary transmission module or at the secondary transceiving module, a second binary data transmitted by the secondary transmission module or by the primary transceiving module, respectively, through the capacitive coupling between the primary transceiving armatures and the respective secondary transceiving armatures, and generating a multilevel signal having: a first value of voltage, if both the first binary data and the second binary data represent a logic value 0, a second value of voltage, if the first binary data and the second binary data represent different logic values, or a third value of voltage, if both the first binary data and the second binary data represent a logic value 1.

In this way it is possible to manage a full duplex data exchange using a single capacitive coupling both for the transmission and the reception of data.

BRIEF DESCRIPTION OF THE DRAWINGS

Further features and advantages of the invention shall be readily apparent from reading the following description provided by way of non-limiting example, with the aid of the figures illustrated in the accompanying tables.

FIGS. 2A-2D are schematic representations of the inductive elements and of capacitive armatures circumscribed thereby according to an embodiment of the present invention.

FIG. 4A is a block diagram of a primary circuit and of a secondary circuit of the system according to another embodiment of the present invention.

FIG. 4B is a schematic representation of an inductive element implemented in the primary circuit of FIG. 4A.

FIG. 5 is a block diagram of a primary circuit and of a secondary circuit that is alternative to that of FIG. 4A.

FIGS. 6A and 6B are respective block diagrams of a primary circuit and of a secondary circuit in which a circuit portion of a first device and of a second device of the system are used as coupling armatures according to two additional embodiments of the present invention.

FIGS. 7A and 7B are respective block diagrams of a primary circuit and of a secondary circuit in which a shielding element is used as a coupling armature according to two additional embodiments of the present invention.

BEST MODE OF THE INVENTION

Figure 1:
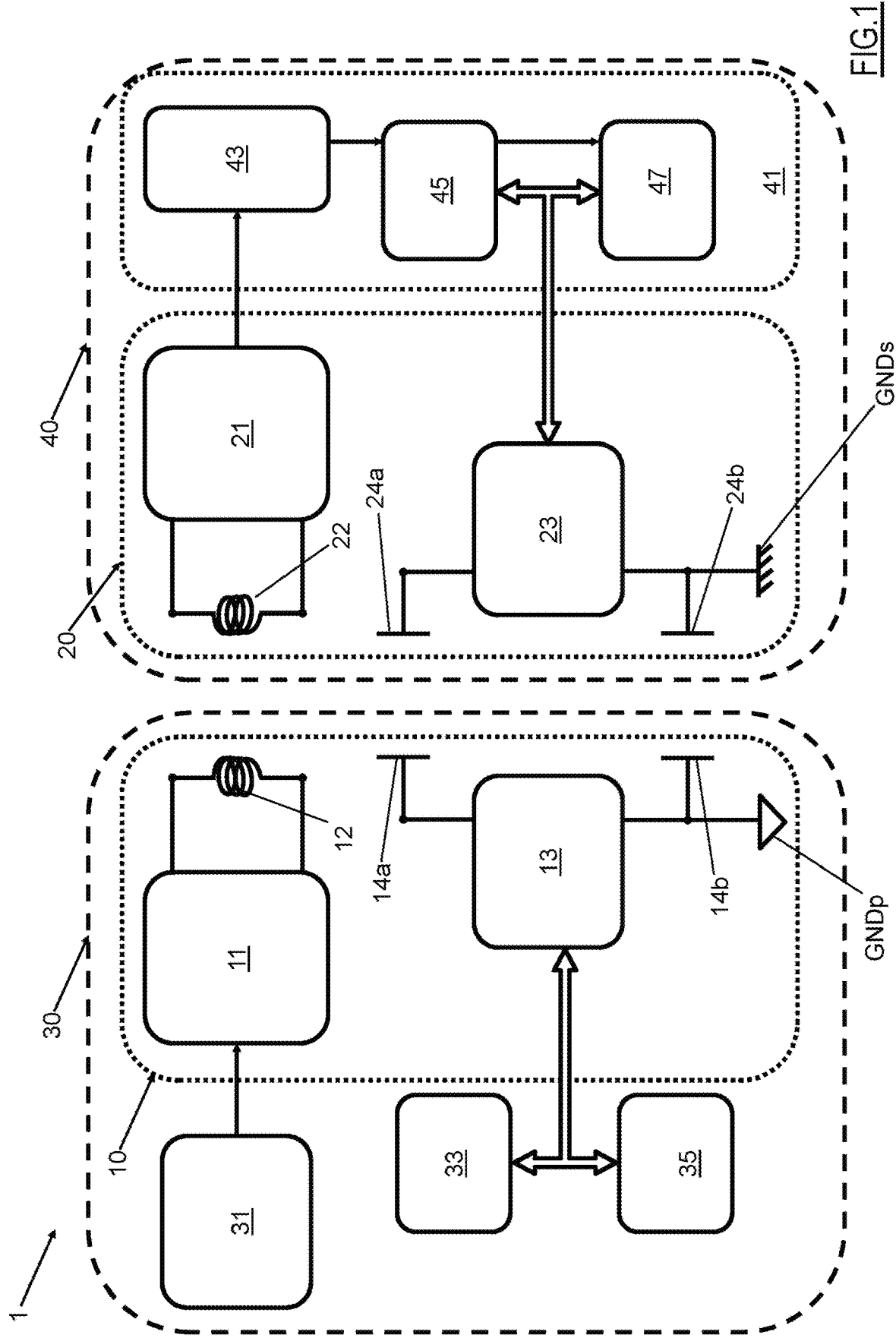
FIG. 1 is a block diagram of a system for transferring energy and exchanging data according to an embodiment of the present invention.

With particular reference to the figures, the numeral 1 designates in its entirety a system for transferring electric energy and data according to embodiments of the present invention.

The system 1 comprises a primary circuit 10 and a secondary circuit 20. The circuits 10 and 20 are physically separate and independent of each other. In particular, the primary circuit 10 is adapted to transfer electric energy and to exchange data with the secondary circuit 20 with a direct electrical connection between the two circuits. For example, the primary circuit 10 can be included in a first stationary electronic device 30, such as a docking station, while the secondary circuit 20 can be included in a second portable electronic device 40 such as a cell phone, a smartphone, a table, a personal computer, a photo/video camera, etc.

Hereafter, the adjective "primary" is used to indicate that the element to which it refers belongs to the primary circuit 10. Similarly, the adjective "secondary" is used to indicate that the element to which it refers belongs to the secondary circuit 20.

In a first embodiment, the primary circuit 10 comprises an electric energy source module—indicated as source module 11 hereafter —, a primary inductive element 12—for example a transmission inductor or inductive coil, a primary transceiver module 13 and a pair of primary transceiving armatures, or more briefly primary armatures 14a and 14b.

In an embodiment, the source module 11 is connected to a power supply module 31 of the first device. For example, the power supply module 31 comprises a battery, a power circuit and/or a wiring connected to a power supply grid, or else it can in turn draw the energy from another transmission system without electrical connections.

Preferably, the source module 11 comprises a DC/AC or AC/AC conversion circuitry—for example, a switching conversion circuit.

The primary transceiving module 13 comprises a circuitry adapted to convert, or encode, data—for example, in binary format—into an electrical signal. Advantageously, the circuitry of the primary transceiving module 13 is adapted to execute also the inverse operation, i.e. to convert, or decode, electrical signals into data.

The primary inductive element 12 is connected to the source module 11 through a respective pair of terminals. The primary transceiving module 13 is connected to both primary armatures 14a and 14b. In the example of FIG. 1, the first primary armature 14a is connected to a first output terminal of the primary transceiving module 13, while the second primary armature 14b is connected to a second output terminal of the primary transceiving module 13, which is also connected to a reference terminal of the primary circuit 10. Advantageously, the primary transceiving module 13 is connected to a processor module 33 and/or to a memory module 35—volatile and/or non-volatile—of the first device 30.

The secondary circuit 20 comprises an electric energy conversion module—indicated as conversion module 21 hereafter —, a secondary inductive element 22—for example a reception inductor or inductive coil, a secondary transceiver module 23 and a pair of secondary transceiving armatures, or more briefly secondary armatures 24a and 24b.

The conversion module 21 comprises a circuitry adapted to transform a wave of electric voltage variable over time (AC) into another voltage, for example direct (DC), to power a load 41—for example, a battery 43, one or more processing modules 45, one or more memory modules 47, or any other electrical load, including sensors, actuators or other electrical apparatus. In another embodiment, the conversion module 21 can convert the wave of electric voltage variable over time (AC) into another wave that is variable over time (AC) with different characteristics of amplitude or frequency to power any type of electrical load that operates with alternating current, including resistive elements, electric motors or other electrical apparatuses.

The secondary transceiving module 23 has a structure that substantially corresponds to the primary transceiving module 13, mutatis mutandis, and a description thereof will not be replicated for the sake of brevity.

The secondary inductive element 22 is connected to the conversion module 21 through a respective pair of terminals. The secondary transceiving module 23 is connected to both secondary armatures 24a and 24b.

In this case, too, the first secondary transceiving armature, indicated as first secondary armature 24a hereafter, is connected to a first output terminal of the secondary transceiving module 23, while the second secondary transceiving armature, indicated as second secondary armature 24b hereafter, is connected to a second output terminal of the primary transceiving module 23, which is also connected to a reference terminal of the secondary circuit 20.

Advantageously, the secondary transceiving module 23 is connected to the processing module 45 and/or to the memory module 47 of the second device 40 to receive from/send to said data modules, for example in binary format.

In the solution in accordance with embodiments of the present invention, the primary circuit 10 is adapted to transfer electric energy to the secondary circuit 20 through an inductive coupling. In addition, the primary circuit 10 and the secondary circuit 20 are adapted to exchange data through a capacitive coupling. Advantageously, the transfer of energy and the exchange of data are mutually independent and can be carried out simultaneously or at different instants in time.

In use, the electric energy transfer is implemented in the following way. The source module 11 is configured to generate a primary electric wave $S_{E1}$ variable over time with a first frequency $f_1$ predetermined or included within a predefined interval, preferably of the order of hundreds of KHz or of MHz. The primary electric wave $S_{E1}$ excites the primary inductive element 12 which generates a corresponding electromagnetic field that is variable over time. This electromagnetic field is, at least partially, collected by the secondary inductive element 22 which in turns generates a secondary electric wave $S_{E2}$. In other words, the primary inductive element 12 and the secondary inductive element 22 are coupled inductively to each other—i.e., they operate substantially as a transformer—and allow the transfer of electric energy from the primary circuit 10 to the secondary circuit 20. The secondary electric wave $S_{E2}$ powers the conversion module 21, which is adapted to convert the secondary electric wave $S_{E2}$ itself and provide it to the load 41 of the second device 40 appropriately conditioned, for example converted into a different voltage of into an appropriate current. In particular, the conversion module 21 is adapted to convert the secondary voltage wave $S_{E2}$ into a pair of power supply voltage $V_{DD}$ and power supply current $I_{DD}$ adapted to power the load 41 of the second device 40 and hence to supply electric energy to the load 41 through the pair of voltage and power supply current $V_{DD}$ and $I_{DD}$.

Instead, the data exchange between the primary circuit 10 and the secondary circuit 20 is implemented in the following way, where a data transmission from the primary circuit 10 to the secondary circuit 20 is considered. The primary transceiving module 13 receives data—for example a string or a sequence of strings of binary values—from the processor module 33 or from the memory module 35 of the first device 30 to be sent to the second device 40. Consequently, the primary transceiving module 13 converts (encodes) the data into a primary electrical signal $S_{D1}$ variable over time with a predetermined second frequency $f_2$—for example, included within a predefined interval, preferably in the order of some MHz or GHz. Preferably, the second frequency $f_2$ is higher than the first frequency $f_1$; for example, the second frequency $f_2$ is higher by at least one order of magnitude, more preferably by two orders of magnitude, than the first frequency $f_1$. It is also possible for the second frequency $f_2$ to be variable within an interval or bandwidth of frequencies, for example delimited by a minimum value of frequency $f_{2\_min}$ and a maximum value of frequency $f_{2\_max}$, with the minimum value of frequency $f_{2\_min}$ preferably higher than the first frequency $f_1$.

The primary electrical signal SDI is adapted to vary the electric charge accumulated on the primary armatures 14a and 14b generating a variable electrical field that causes a corresponding accumulation of charges of opposite sign on the secondary armatures 24a and 24b, thereby generating a secondary electrical signal $S_{D2}$. In other words, each primary armature 14a and 14b couples capacitively to the corresponding secondary armature 24a and 24b to form a corresponding capacitor $C_1$ and $C_2$. In this way, a circuit is formed that connects the two transceiving modules 13 and 23 and makes it possible to transfer an electrical signal from the primary circuit 10 to the secondary circuit 20.

Depending on needs, one of the two primary armatures and one of the two secondary armatures, for example the primary armature 14b and the secondary armature 24b, can be connected to the reference node, and hence to the corresponding primary reference potential (GNDp), of the primary circuit 10 and to the corresponding secondary reference potential (GNDs), of the secondary circuit 20 in effect coupling the two reference potentials to the secondary frequency $f_2$ of transmission of the data signals.

The second secondary electrical signal $S_{D2}$ is received by the secondary transceiving module 23 that converts (decodes) it into the data initially provided to the primary transceiving module 13. Subsequently, the secondary transceiving module 23 provides the data to the processing module 45 and/or a memory module 47—volatile and/or non-volatile—of the second device 40.

It will be readily apparent to the person skilled in the art that the dual operation, i.e. the transmission of data from the secondary circuit 20 to the primary circuit 10, takes place in a substantially corresponding manner, mutatis mutandis.

In an alternative embodiment, the capacitive coupling between the primary armatures 14a and 14b and the secondary armatures 24a and 24b can be used as a 'bridge' to couple a primary communication channel with a secondary communication channel so as to define a continuous (data) communication channel between the primary circuit 10 and the secondary circuit 20.

For example, the capacitive coupling can be used as a data communication means, alternative to those currently in use for the identification of the interconnected devices and for the feedback necessary for the inductive power regulation on the load present on the secondary.

In another embodiment example, the capacitive coupling can be used to define a continuous communication channel between the primary circuit 10 and the secondary circuit 20 to exchange data between a communication channel selected between a wired connection such as USB, PCI Express, HDMI, Display Port, Ethernet, CAN, LIN, Flexray type, or any other known standard. In particular, the capacitive coupling according to the embodiments of the present invention creates a virtual wiring that connects two portions of communication channel (for example two portions of USB cables) each included in a respective device 30 or 40, and connected to a respective transceiving module 13 or 23. In this case, the two transceiving modules 13 and 23 are configured to receive data encoded according to the standard of the selected communication channel, to convert them into the primary electrical signal $S_{D1}$ and secondary electrical signal $S_{D2}$, respectively, and to decode the secondary electrical signal $S_{D2}$ and the primary electrical signal $S_{D1}$ received, respectively, anew into data coded according to the standard of the selected communication channel.

Advantageously, this variant allows a secure and reliable data connection between the second electronic device 40, which comprises the secondary circuit 20, and one or more devices connected to the first electronic device 30, comprising the primary circuit 10, both through an additional capacitive coupling and through a wired coupling. In other words, a first electronic device 30, comprising the primary circuit 10 can be configured to operate from hubs for the exchange of data between two or more devices (like the second device 40) connected thereto.

In embodiments of the present invention, it is possible to manage a full duplex exchange of data as described hereafter. Both transceiving modules 13 and 23 are configured for the management of full duplex communication—i.e. they are able to transmit and receive data flows concurrently and independently.

For example, an embodiment (not illustrated herein) comprises an additional primary armature and an additional secondary armature able to be mutually coupled so as to define a third capacitor. In this way it is possible to define an additional data exchange channel and then to carry out a data transmission in parallel to a data reception from primary circuit 10 to secondary circuit 20, and vice versa.

Alternatively, it is possible to assure the bit rate of the full duplex communication using only the two primary armatures 14a and 14b coupled with the two secondary armatures 24a and 24b in the circuit of FIG. 1, simply providing a system of appropriately dimensioned and configured buffers to temporarily store part of the data to be transmitted and mechanisms for the arbitration of the data transmission in the capacitive channel. As will be readily apparent to the person skilled in the art, this is particularly useful in the cases in which the system of FIG. 1 serves as an interface between two full duplex systems, because it assures the bandwidth (and hence the desired bit rate) of the full duplex system using a minimum number of armatures and a half duplex scheme.

This solution makes it possible to avoid increasing the number of armature, which is particularly advantageous in implementations having particularly reduced dimensions and/or to contain the production costs and the complexity of the system 1.

The applicant has found that it is possible to implement a full duplex communication providing transceiving modules 13 and 23 configured to encode the (binary) data to be transmitted and the (binary) data received in a determined time interval in a single multilevel signal M, able to assume multiple levels or values of voltage.

The transceiving module 13 encodes the (binary) data to be transmitted through the primary electrical signal $S_{D1}$ (provided for example by the processing module 33) and the (binary) data contained in the secondary electrical signal $S_{D2}$ received in a multilevel signal $M_1$.

It will be readily apparent to the person skilled in the art that the dual operation, i.e. data transmission and receipt in the secondary through the transceiving module 23, takes places in an entirely similar manner, mutatis mutandis.

In more detail, the primary transceiving module 13 or, equivalently, the secondary transceiving module 23 is configured to generate the corresponding primary multilevel signal $M_1$ or secondary multilevel signal $M_2$ at a first value of voltage (in the corresponding communication time interval), for example 0 V, to indicate that a logic 0 is to be transmitted and, at the same time, a logic 0 has been received from the other secondary transceiving module 23, or primary transceiving module 13, respectively. If a logic 1 is to be transmitted and, at the same time, a logic 0 has been received, or in the dual case, in which a logic 0 is to be transmitted and, at the same time, a logic 1 has been received, the primary transceiving module 13 or, equivalently, the secondary transceiving module 23 is configured to impose a second value of voltage, for example 3.3 V, to the corresponding primary multilevel signal $M_1$ or secondary multilevel signal $M_2$. Advantageously, in the considered case in which only one between the primary transceiving module 13 or the secondary transceiving module 23 transmits a logic 1, it is not necessary to distinguish which transceiver is transmitting the logic value 1, because each transceiving module 13 and 23 is aware of transmitting or not transmitting a logic 1 in a determined communication interval. Lastly, if a logic 1 is to be transmitted and, at the same time, a logic 1 has been received, the primary transceiving module 13 or, equivalently, the secondary transceiving module 23 is configured to generate the corresponding primary multilevel signal $M_1$ or secondary multilevel signal $M_2$ at a third value of voltage, for example 5 V.

Thanks to the configuration just described above, it is possible to avoid the need for buffers to store the transmitted and received data, while still assuring the capability to manage a full duplex communication by means of the transceiving modules 13 and 23, still without raising the number of armatures required, hence effectively implementing a full duplex data exchange. Moreover, the coding of the primary multilevel signa $IM_1$ and secondary multilevel signal $M_2$ according to the present invention makes it possible to represent the four possible combinations of sent/received binary data with only three levels of voltage. Advantageously, this reduced number of levels or values of voltage used makes it possible to assure good robustness against interference of the data transmission system by selecting the first value of voltage (0 V), the second values of voltage (3.3 V) and the third value of voltage (5 V) at as great a distance from each other as possible with respect to the available power supply dynamics (such as a power supply voltage of 5 V in the case of the numerical examples provided above).

Alternatively, to increase data transmission reliability, it is possible to associate to the logic 0 a value of voltage different from 0 V, for example 1 V, in order to identify, through the detection of a value of voltage of 0 V, transmission/reception errors or problems.

In an alternative embodiment, it is possible to configure the transceiving modules 13 and 23 to generate the corresponding primary multilevel signal $M_1$ or secondary multilevel signal $M_2$ so as to associate the information of the logic values of the data received and transmitted to the transition from a value of voltage or to another value of voltage instead of to the values themselves. In other words, the information of the logic values of the data received and transmitted is contained in the wavefronts of the primary multilevel signal $M_1$ or secondary multilevel signal $M_2$ generated by the transceiving modules 13 and 23.

In addition, it is possible to transmit supplementary binary data (for example, parity bits) and/or to implement algorithms useful to verify and assure the integrity of the data exchanged by the transceiving modules 13 and 23.

The Applicant has found that it is possible to form one or both of the primary armatures 14a and 14b, and one or both of the secondary armatures 24a and 24b with solutions adapted to maintain compact the structures of the primary circuit 10 and of the secondary circuit 20, while maintaining high efficiency and effectiveness both of the energy transfer and of the data exchange, and keeping the costs comparable to those typical of the inductive energy transmission system alone.

In an embodiment, the primary armatures 14a and 14b, and the secondary armatures 24a and 24b comprise a conductive element having two predominant dimensions with respect to the third dimension—for example planar. Preferably, each primary armature 14a and 14b and each secondary armature 24a and 24b comprises a pad of conductive material—such as copper—provided on a support surface. The support surface can for example be independent insulating material—polymeric or ceramic, or also a printed circuit board—or the electric board on which the components of the primary circuit 10 and of the secondary circuit 20 are mounted, respectively.

If the thickness of the conductive material is sufficient to confer sufficient strength and rigidity to the pad of conductive material, use of support materials can be avoided. For example a plate of copper of aluminium or a metal frame can advantageously be used as a conductive material adapted to produce the primary armatures 14a and 14b, and secondary armatures 24a and 24b without requiring a dedicated support surface.

Advantageously, the planar conductive element can be produced with the same techniques and materials with which the inductive elements are formed 12 and 22, if the latter are inductors drawn on a printed circuit board and not traditional inductors obtained by means of wound wires.

Regardless of the specific type of the inductive elements 12 and 22, the primary armatures 14a and 14b, and secondary armatures 24a and 24b can be formed in proximity to or distant from the inductive elements 12 and 22, respectively, according to the specific application. Typically, it is opportune and advantageous to provide the primary armatures 14a and 14b, and the secondary armatures 24a and 24b in proximity to the inductive elements 12 and 22, or integrated therein, to obtain the primary circuit 10 and the secondary circuit 20 with particularly compact structures. Preferably, the primary armatures 14a and 14b, and the secondary armatures 24a and 24b and the inductive elements 12 and 22 are planar shaped—although nothing prohibits shaping them with any shape to be adapted to the application—for example planar for smartphones, cylindrical for items like electric toothbrushes, remove controls or other electrical appliances, etcetera.

As shown in the example of FIG. 2A, at least one of the primary armatures 14a or 14b comprises a planar conductive element 50 positioned inside a region delimited by the primary inductive element 12. Similarly, at least one of the secondary transceiving armatures 24a or 24b comprises a planar conductive element (not shown) positioned inside a region delimited by the secondary inductive element 22. Preferably, the primary armature 14a and secondary armature 24a which, in use, are coupled to form the corresponding capacitor $C_1$ or the primary armature 14b and the secondary armature 24b which, in use, are coupled to form the corresponding capacitor $C_2$ comprise the planar conductive element formed in the region delimited by the respective inductive element 12 or 22. More preferably, said conductive elements are shaped with a same surface area. Advantageously, the arrangement of the planar conductive elements 50 assures a rotational or translational alignment freedom between the primary circuit 10 and the secondary circuit 20. In other words the primary 14a and secondary 24a armatures shaped as described above are coupled to form the capacitor $C_1$ regardless of a relative orientation or positioning of the primary circuit 10 and of the secondary circuit 20. Advantageously, the capacity of the capacitor $C_1$ is substantially uniform—at the limit, within a predetermined range of values—regardless of the relative orientation or positioning of the primary circuit 10 and of the secondary circuit 20.

In alternative embodiments, both primary armatures 14a and 14b can comprise respective conductive elements formed in the region delimited by the inductive element 12. Naturally, the secondary armatures 24a and 24b too can comprise respective conductive elements formed, in a similar manner, in the region delimited by the inductive element 22. In the example of FIG. 2B, each of the primary armatures 14a and 14b comprises respective planar conductive elements 51a and 51b shaped concentric to each other in the region delimited by the inductive element 12. A similar arrangement must be provided in the corresponding secondary armatures 24a and 24b. In this way, freedom of angular positioning of the secondary element with respect to the primary element is assured. In the example of FIG. 2C, each of the primary armatures 14a and 14b comprises a plurality of planar conductive elements 52a and 52b shaped with a checkerboard arrangement—i.e., arranged alternating along two mutually perpendicular axes—in the region delimited by the inductive element 12. A similar arrangement must be provided in the corresponding secondary armatures 24a and 24b. In this way, freedom of translational positioning along two Cartesian axes of the secondary element with respect to the primary element is assured. In the example of FIG. 2D, each of the primary armatures 14a and 14b comprises a plurality of planar conductive elements 53a and 53b shaped with a side by side arrangement—i.e., arranged alternating along a predetermined and preferential direction—in the region delimited by the inductive element 12. A similar arrangement must be provided in the secondary armatures 24a and 24b. As in the previous case, in this way too freedom of translational positioning along two Cartesian axes of the secondary element with respect to the primary element is assured. Advantageously, the arrangement of the planar conductive elements 50, 51a and 51b, 52a and 52b, and 53a and 53b assures a rotational or translational freedom between the primary circuit 10 and the secondary circuit 20. In other words the primary armatures 14a and 14b and the armatures 24a and 24b shaped as described above are coupled to form the capacitors $C_1$ and $C_2$ in a substantially independent manner of a relative orientation of the primary circuit 10 and of the secondary circuit 20. Advantageously, the capacity of the capacitors $C_1$ and $C_2$ is substantially uniform—at the limit, within a predetermined range of values—regardless of the relative orientation of the primary circuit 10 and of the secondary circuit 20.

Preferably but not necessarily, and in any case not limitedly, the total surface areas of the planar conductive elements 51a, 52a and 53a correspond to the total surface areas of the planar conductive elements 51b, 52b and 53b, respectively, so as to define capacitors $C_1$ and $C_2$ with substantially equal capacities when the primary armatures 14a and 14b the armatures 24a and 24b are coupled.

These structures, or layouts in the technical jargon, of the primary armatures 14a and 14b and of the armatures 24a and 24b allow to obtain capacitors $C_1$ and $C_2$ with capacities of a value adapted to capacitive data transfer at a frequency $f_2$ of a high value—such as between some MHz and some GHz. For example, it is possible to obtain capacitors $C_1$ and $C_2$ with capacities ranging from the order of a few pF to capacities of the order of hundreds of pF or of nF without requiring substantial changes to the structure of the inductive elements 12 and 22 which surround the planar conductive elements.

Figure 3A:
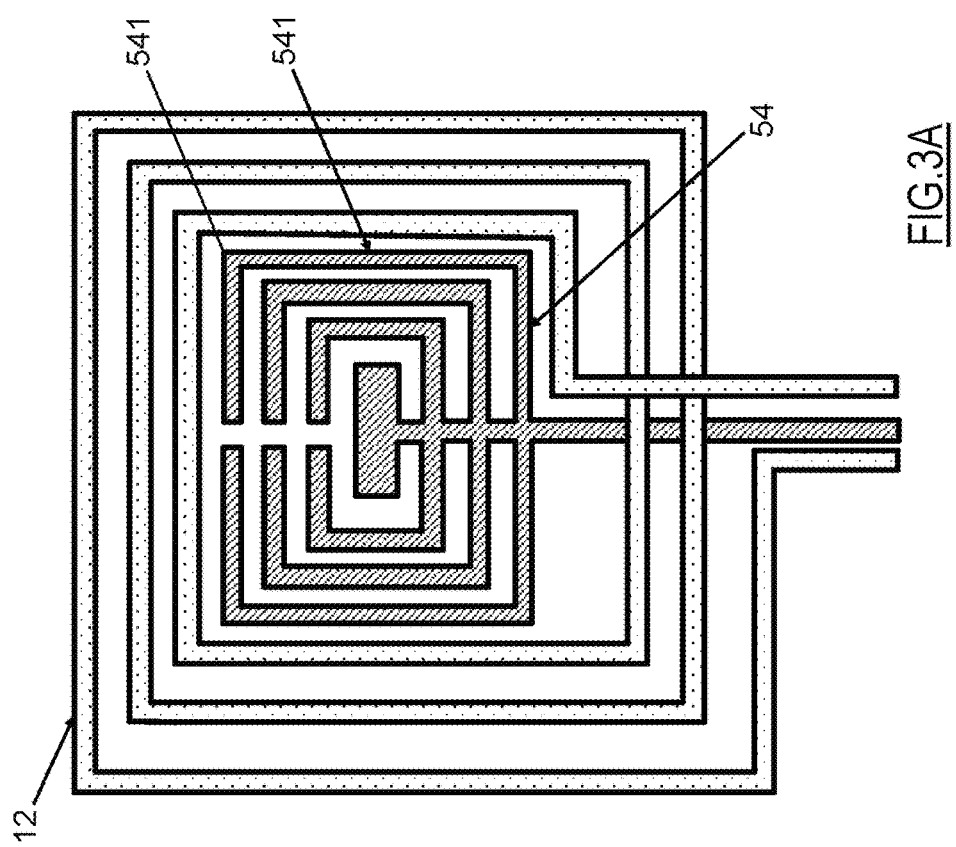
FIGS. 3A and 3B are schematic representations of the inductive elements and of capacitive armatures circumscribed thereby according to a different embodiment of the present invention.
Figure 3B:
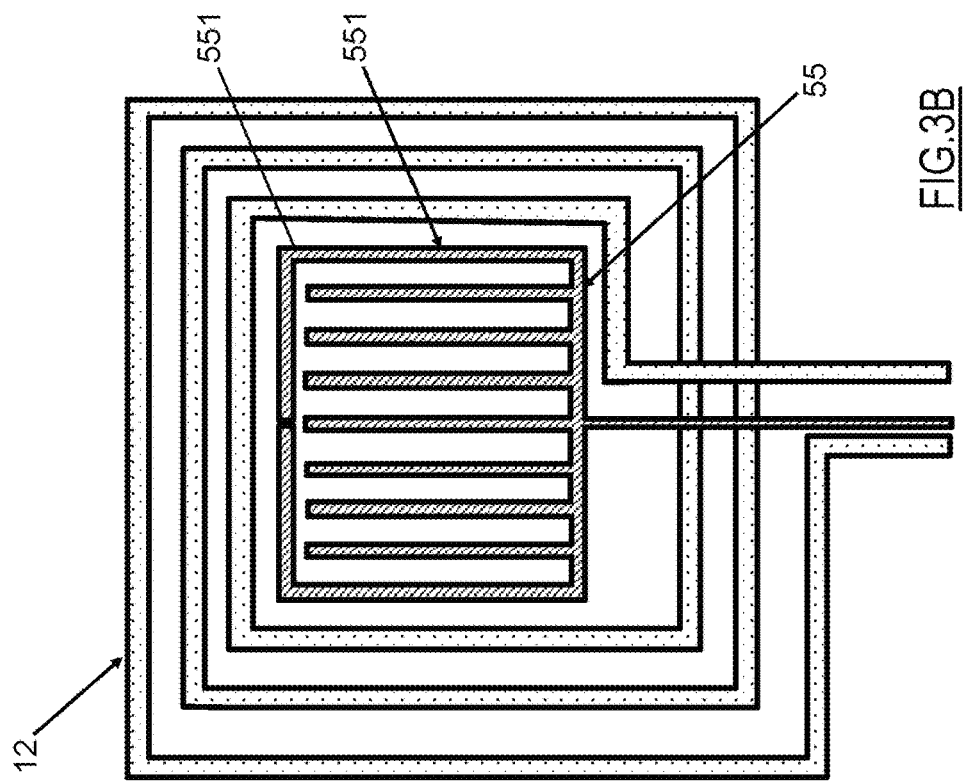

In addition, the planar conductive elements can be obtained with an open loop or comb structure. In the examples considered in FIGS. 3A and 3B, planar conductive elements 54 and 55 are obtained according to a 'multifingered' structure. In other words, each of the planar conductive elements 54 and 55 comprising pluralities of elongated portions 541 and 551 or 'fingers', respectively, which are distanced and separate from in each other so as not to form loops. These multifingered planar conductive elements 54 and 55 allow to maintain high the total surface area of the armature 14a, 14b, 24a or 24b thus obtained, maximising the coupling capacity, while allowing to abate and possibly eliminate the emergence of parasitic current—in particular, the so-called eddy currents, also known as Foucault currents—generated in the armatures 14a, 14b, 24a or 24b by the variable magnetic field generated by the inductive elements 12 and 22 traversed by the current for the transfer of energy. In this way, a reduction in efficiency is avoided or limited in the transfer of energy between the primary circuit 10 and the secondary circuit 20 due to the loss of electric energy in transfer caused by the generation of these parasitic currents and any interference of the power exchange system with respect to the data exchange system. Moreover, the abatement of the parasitic currents induced by the magnetic field avoids or lowers the probability of a false detection of a spurious object—i.e. a conductive object different from, or not including, the secondary circuit 20—by a protection/energy saving circuitry—known in the art as Foreign Object Detection, FOD, and not described in detail herein—which can be integrated in the primary circuit 10 (or in the device 30).

Preferably, each conductive element—in particular, multifingered conductive elements 54 and 55 and conductive elements 51a, 52a and 53a—is made with a track of electrically conductive material with width of the order of a mm or tens of mm. In this way, the parasitic currents induced in the conductive elements are substantially reduced, abating conflicts between the inductive transmission of electric energy and the capacitive exchange of data. At the same time, traces of such dimensions allow to define multifingered conductive elements 54 and 55 adapted to form $C_1$ and $C_2$ with capacity of a value adapted for capacitive data transfer at a frequency $f_2$ of high value, preferably with a value of capacity from a pF to a nF. Advantageously, although without limitation, each conductive element 50, 51a, 52a and 53a, 54 and 55 can be obtained with a track of conductive material with reduced thickness, for example equal to or smaller than 50 μm, preferably smaller than 1 μm. In addition, the inductive elements 12 and 22 too can be obtained with a track made of electrically conductive material, possibly but not necessarily with thickness equal or similar to the conductive elements 50, 51a, 52a, 53a, 54 and 55. These dimensions allow further to limit the size of the parasitic currents, to obtain with a single support inductive coils and capacitive armatures and to minimise other parasitic effects like the skin effect.

Alternatively or additionally, one or more of the primary armatures 14a and 14b and/or of the secondary armatures 24a and 24b can be implemented exploiting circuit portions of the primary circuit 10 and of the secondary circuit 20—or portions of the first device 30 and of the second device 40, respectively—having a different main purpose. In other words, one or both of the primary armatures 14a or 14b of the system 1 are defined by a respective primary circuit portion and one or both of the corresponding secondary armatures are defined by a respective secondary circuit portion. Each primary circuit portion and each respective secondary circuit portion, although they have a different main purpose, are adapted or are made adapted also to interact with each other defining a capacitor $C_1$ or $C_2$ of predetermined capacity.

In this way it is possible to obtain a particularly compact structure of the primary circuit 10 and of the secondary circuit 20, which does not need additional armatures or components to achieve the coupling capacity useful to the exchange of data. Thus, this solution generally requires a reduced number of circuit components.

In the example of FIG. 4B, a first primary circuit portion 61a comprises a portion of the primary inductive element 12 proximal to a first connection terminal 121 included in the primary inductive element 12, provided—together with a second terminal 122—for connection with other circuit components, such as the source module 11. Preferably, although without limitation, a second primary circuit portion 61 is also exploited, which comprises a portion of the primary inductive element 12 proximal to the second connection terminal 122. The extension of the primary circuit portions 61a and 61b depend on a working frequency of the data exchange operation, i.e. the second frequency $f_2$, and on the inductance of the respective inductive element 12 and 22. In detail, a central portion 63 of the inductive element 12 or 22 behaves like an open circuit at the second frequency $f_2$ electrically separating the primary circuit portions 61 from each other. Similarly, in the secondary circuit 20, as well, can be exploited a pair of secondary circuit portions 62a and 62b each proximal to a respective connection terminal (not shown) of the secondary inductive element 22. The extension of the secondary circuit portions 62a and 62b substantially corresponds to the extension of the primary circuit portions 61a and 61b given the coupled operation of the inductive elements 12 and 22.

In the example of FIG. 4A, the primary circuit portions 61a and 61b are connected to each other by means of a primary bridge capacitor 71 and to the reference terminal by means of a primary tail capacitor 71. Similarly, the secondary circuit portions 62a and 62b are connected to each other by means of a secondary bridge capacitor 73 and to the reference terminal by means of a secondary tail capacitor 74. Advantageously, the capacitors 71, 72, 73 and 74 are dimensioned so as to operate substantially as short-circuits at the second frequency $f_2$ and as open circuits at the first frequency $f_1$.

Thanks to this configuration, at the second frequency $f_2$ the primary portions 61a and 61b define the second primary armature 14b in series to the transceiving module 13 through the respective reference terminal, and the secondary circuit portions 62a and 62b define the second secondary armatures 24b in series to the transceiving module 23 through the respective reference terminal.

The actual capacity of the capacity $C_2$ formed by the coupling between the armatures 14b and 24b depends on the extension of the primary circuit portions 61a and 62b and of the secondary circuit portions 62a and 62b, on their distance and on the dimensions of the conductive filament that composes the inductive elements 12 and 22. In the case of FIG. 4B, the inductive element 12 (as well as, similarly, the inductive element 22 not shown) has a planar format; therefore, a width w of the track of conductive material that defines it contributes to determine the capacity of the capacity $C_2$. In any way, the inductive elements 12 and 22 formed with known technologies allow to define a capacitor $C_2$, with capacity between a few pF to the order of some nF according to implementation needs without requiring particular expedients in the construction of the system 1.

In the embodiment illustrated in FIG. 5, the electrical separation given by the central part of the inductor at the frequency $f_2$ allows to exploit as independent circuit portions each segment of the inductive elements 12 and 22 that is proximal to a respective terminal. In other words, the primary circuit portions 61a and 61b are used independently of each other and the corresponding two secondary circuit portions 62a and 62b are used independently of each other.

In detail, the first primary portion 61a is connected to the primary transceiving module 13 through a bridge capacitor 72, while the second primary portion 61b is connected to the reference terminal through a tail capacitor 71. Similarly, the first secondary portion 62a is connected to the secondary transceiving module 23 through a bridge capacitor 77, while the second secondary portion 62b is connected to the reference terminal through a tail capacitor 78. Advantageously, the capacitors 75, 76, 77 and 78 are dimensioned so as to operate substantially as short-circuits at the second frequency $f_2$ and as open circuits at the first frequency $f_1$.

In this configuration, the first primary portion 61a defines the first primary armature 14a, while the second primary portion 61b defines the second primary armature 14b. Similarly, the first secondary portion 62a defines the first secondary armature 24a, while the second secondary portion 62b defines the second secondary armature 24b. Thanks to this configuration, both capacitors $C_1$ and $C_2$ are obtained exploiting the parasitic capacity that is formed between the inductive elements 12 and 22 during their normal operation. This allows to obtain primary 10 and secondary 20 circuits with a more compact structure that can be obtained with a lower number of process steps because it is not necessary to form ad hoc armatures for the exchange of data. In particular, it is possible to obtain a high speed exchange of data without any need to change the inductive part, which serves at the same time also as a capacitive coupling armature. In this case, too, the inductive elements 12 and 22 formed with known technologies allow to define the capacitors $C_1$ and $C_2$ with respective capacities between a few pF to the order of some nF according to implementation needs without requiring particular expedients in the construction of the system 1.

Figure 6A:
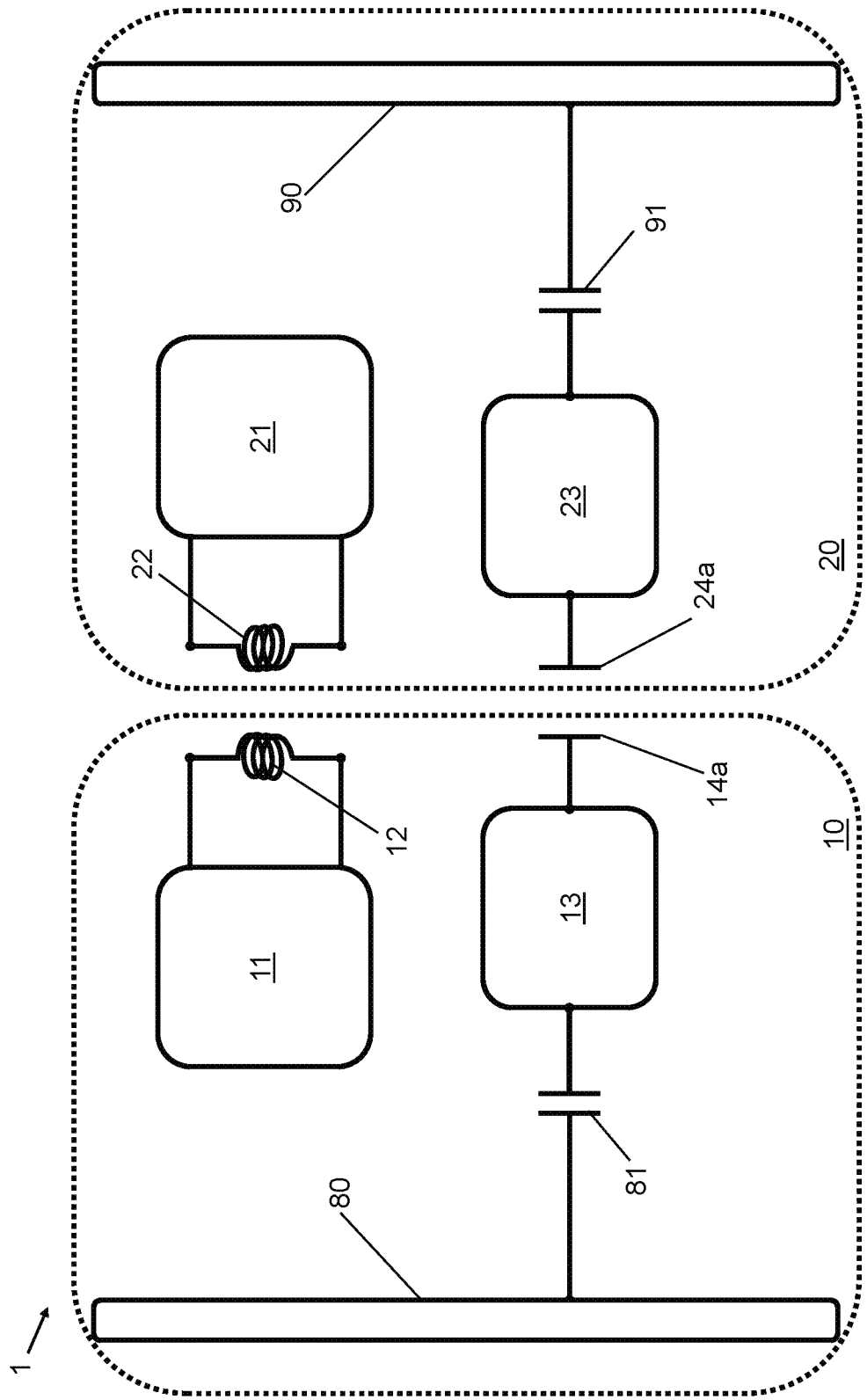

According to an alternative embodiment, one of the primary armatures 14a or 14b and the corresponding secondary armature 24a or 24b, like the second primary armature 14b and the second secondary armature 24b in the example of FIG. 6A, are formed exploiting a part 80 and 90 of the first device 30 and of the second device 40, respectively, in particular a portion made of conductive material of a respective casing or frame, of an EMI shielding element or a ground plane of the first device 30 and of the second device 40. In this way, it is possible to obtain the second capacitor $C_2$ with desired capacity without requiring additional components dedicated to the primary 10 and secondary 20 primary circuits. In the example of FIG. 6A each part 80 and 90 of the first device 30 and of the second device 40 is connected to the respective transceiver module 13 and 23 through a corresponding bridge capacitor 81 and 91, while the first primary 14a and secondary 14b armatures are formed as described above in particular relation to FIG. 2A in which a planar conductive element 50 is formed in the area delimited by the corresponding inductive element 12 or 21; however, nothing precludes forming the first primary armature 14a and the second primary armature 24a according to different techniques.

Alternatively, as shown in the example of FIG. 6B, the first primary armature 14a and the first secondary armature 24a can be obtained exploiting the primary circuit portion 61, and the secondary circuit portion 62 of the inductive elements 12 and 22, respectively, as described above for example in relation to FIGS. 4A and 4B, so as to exploit the capacitive coupling between said circuit portions to obtain a corresponding first capacitor $C_1$ of desired capacity. In this case, the primary circuit portions 61a and 61b are connected to each other and to the primary transceiving module 13 through respective bridge capacitors 82 and 83. Similarly, the secondary circuit portions 62a and 62b are connected to each other and to the secondary transceiving module 23 through respective bridge capacitors 92 and 93. Advantageously, the capacitors 81-83 and the capacitors 91-93 are dimensioned so as to operate substantially as short-circuits at the second frequency $f_2$ and as open circuits at the first frequency $f_1$.

In this way, both capacitors $C_1$ and $C_2$ of desired capacity are implemented using mutually different circuit portions with reduced construction complexity simply introducing a small number of capacitors.

It is observed that nothing precludes exploiting for example a power supply plane of each circuit 10 and 20 as respective first armature 14a and 14b, and for example the ground plane of each circuit 10 and 20 as respective second pad 24a and 24b so as to obtain a capacitive coupling adapted to the exchange of data without providing armatures dedicated to this purpose.

In this regard, the applicant has observed that it is possible to optimise the dimensions of the parts 80 and 90 of the first device 30 and of the second device 40, for example of the planes of mass and/or power supply, to obtain a capacitive coupling area adapted to allow a reliable and efficient data exchange between the primary circuit 10 and the secondary circuit 20 without comprising the original purpose of the parts 80 and 90.

Figure 7A:
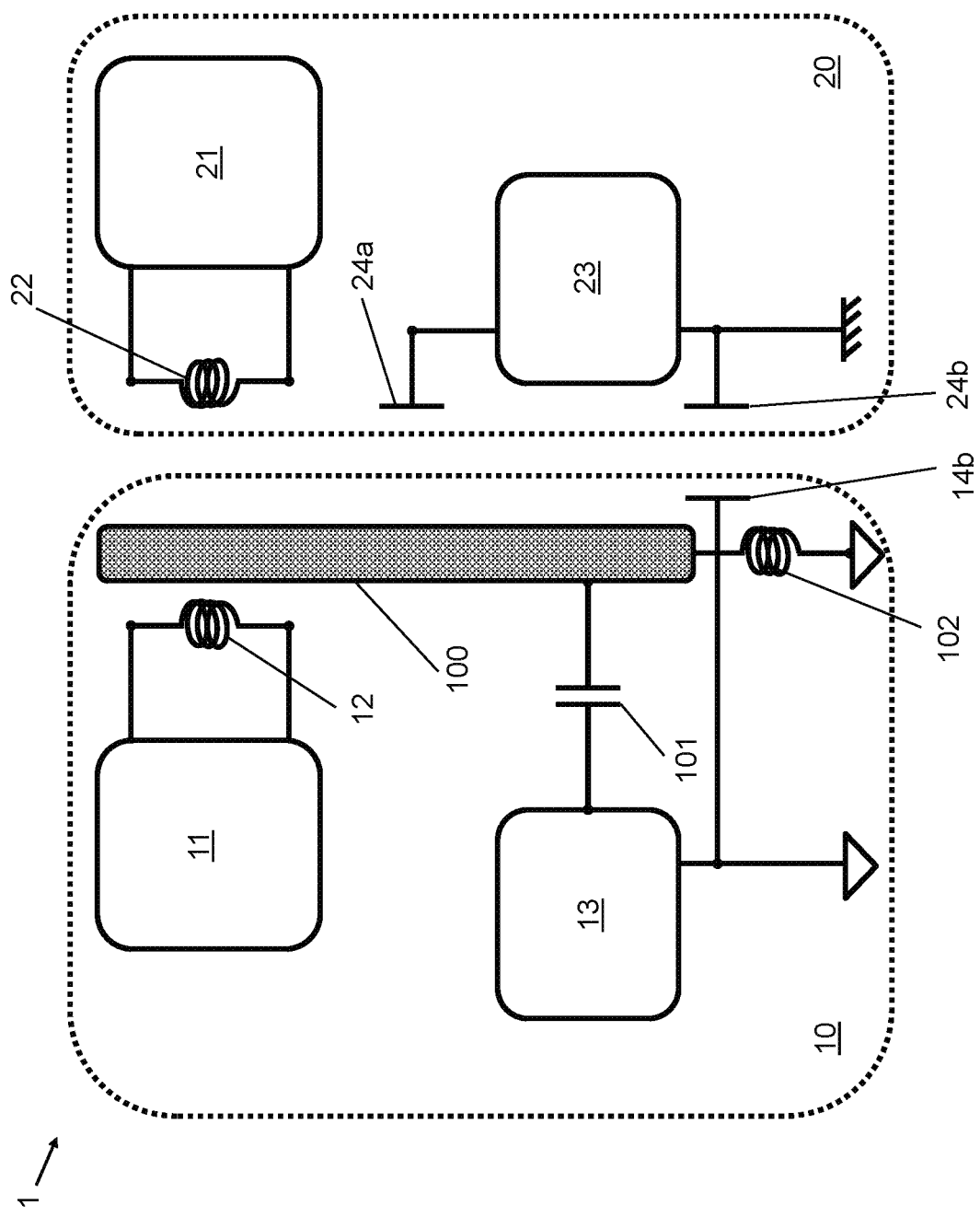

In a difference embodiment shown in FIG. 7A, a primary armature, for example the first primary armature 14a, can be obtained exploiting a shielding element 100 which can be included in the primary circuit 10 configured to attenuate the magnetic field produced by the inductive elements 12 and 22 in the regions where said inductive elements are not spatially superposed—to abate, or at least attenuate, interference phenomena.

In the example considered in FIG. 7A, the shielding element 100 is connected to the primary transceiving module 13 through a bridge capacitor 101, while it is connected to the reference node through an inductor 102. In particular, the capacitor 101 is dimensioned so as to operate substantially as a short-circuit at the second frequency $f_2$ and as an open circuit at the first frequency $f_1$. Vice versa, the inductor 102 is dimensioned so as to operate substantially as a short-circuit at the first frequency $f_1$ and at frequencies lower than $f_2$, and as an open circuit at the second frequency $f_2$.

As shown in the alternative embodiment of FIG. 7B, if the secondary circuit 20 is also provided with a shielding element 110, the latter too can be exploited to obtain a secondary armature, like the first secondary armature 24a in the example considered, similarly to what has just been described. In detail, the shielding element 110 is connected to the secondary transceiving module 23 through a bridge capacitor 111, while it is connected to the reference node through an inductor 112. In particular, the capacitor 111 is dimensioned so as to operate substantially as a short-circuit at the second frequency $f_2$ and as an open circuit at the first frequency $f_1$. Vice versa, the inductor 112 is dimensioned so as to operate substantially as a short-circuit at the first frequency $f_1$ and at frequencies lower than $f_2$, and as an open circuit at the second frequency $f_2$.

The invention thus conceived is susceptible of numerous modifications and variants without departing from the scope of the inventive concept. For example, the shapes, the dimensions and the layout of the inductive elements—and, hence, of any circuit portions that can be mutually coupled—can vary according to design specifications and/or implementative requirements. Similarly, the shapes, the dimensions and the layouts of any pads formed circumscribed by said inductive elements will vary according to design specifications and/or implementative requirements.

Moreover, armature pads can be formed that circumscribe the inductive elements in addition or alternatively to the pads circumscribed by said elements. Otherwise, nothing precludes forming inductive elements and armatures with different structures from the planar ones as inductive elements comprising wire windings and/or armatures formed by plates made of conductive materials.

Furthermore, it is possible to provide primary and secondary armatures connected dynamically to the respective transceiver modules, so as to make the system robust simultaneously with respect to translational and rotational misalignments. In other words, the system 1 comprises at least one of the primary armatures formed by a plurality of planar conductive elements as shown in FIG. 2C or in FIG. 2D and is configured to sense the planar conductive elements implementing an appropriate method of distinguishing them (for example, by an arrangement configured to provide an appropriately calibrated measure of impedance, or through an exchange of information between primary circuit and secondary circuit, preferably according to a dedicated appropriate protocol).

Once the mutual position of the planar conductive elements of the primary circuit and of the secondary circuit is determined, the system can configure a part, for example half, of the planar conductive elements of the primary circuit to excite the first secondary armature, and another part, for example the second half, of planar conductive elements of the primary circuit to excite the second secondary armature with a signal of opposite phase or simply closing the data circuit at the reference terminal. It is evident that to obtain this type of architecture the planar conductive elements of the primary armatures must be in a higher number than the planar conductive elements of the secondary armatures; moreover, the planar conductive elements of the primary armatures are preferably formed with a smaller dimension of the conductive elements of the secondary armatures.

In addition, the embodiments described above can all be combined without departing from the scope of the present invention. For example, an armature formed by a shielding element can be coupled to an armature defined by a pad circumscribed by an inductive element or by one or both of the circuit portions associated with the inductive element. Furthermore, a coupled capacitor can be formed by corresponding elements of the devices comprising the primary and secondary circuit and the other capacitor can comprise an armature defined by the shielding element.

In addition, all details can be replaced by other technically equivalent elements.

In practice, the materials employed, as well as the specific shapes and dimensions, may be any depending on the needs without thereby departing from the scope of protection of the following claims.

The invention claimed is:

1. A system for transferring electric energy and data, comprising a primary circuit and a secondary circuit, wherein
  a) the primary circuit comprises:
    i) an electric energy source module;
    ii) a primary inductive element, which is connected to the source module and comprises a pair of connection terminals;
    iii) a primary transceiver module configured to encode data into electromagnetic signals and to decode electromagnetic signals into data, and
    iv) a pair of primary transceiving armatures connected to the primary transceiver module, b) wherein the secondary circuit comprises:
   i) an electric energy conversion module;
   ii) a secondary inductive element, which is connected to the conversion module and comprises a pair of connection terminals;
   iii) a secondary transceiver module configured to encode data into electromagnetic signals and to decode electromagnetic signals into data, and
   iv) a pair of secondary transceiving armatures connected to the secondary transceiver module,
wherein the primary inductive element and the secondary inductive element are configured to be mutually coupled inductively, allowing a transfer of electric energy from the source module to the conversion module, and
wherein each primary transceiving armature is configured to be coupled capacitively to a respective secondary transceiving armature, allowing an exchange of data between the primary transceiver module and the secondary transceiver module,
wherein at least one of the first primary transceiving armatures is defined by a primary circuit portion, and at least one corresponding first secondary transceiving armature is defined by a secondary circuit portion,
wherein said primary circuit portion and said secondary circuit portion are configured to mutually couple defining a capacitor of predetermined capacity,
wherein said primary circuit portion comprises a portion of the primary inductive element proximal to one of the connection terminals of said primary inductive element, and
wherein said secondary circuit portion comprises a portion of the secondary inductive element proximate to one of the connection terminals of said secondary inductive element.

2. The system according to claim 1, wherein the primary transceiver module is connected to a connection terminal of the primary inductive element and the secondary transceiver module is connected to a connection terminal of the secondary inductive element.

3. The system according to claim 1, wherein a second primary transceiving armature is defined by an additional primary circuit portion, and wherein a second secondary transceiving armature is defined by an additional secondary circuit portion, and within said additional primary circuit portion and said additional secondary circuit portion are configured to interact with each other defining an additional capacitor of predetermined capacity.

4. The system according to claim 1, wherein at least one primary transceiving armature comprises a conductive element positioned inside a region delimited by the primary inductive element and at least one secondary transceiving armature comprises a conductive element positioned inside a region delimited by the secondary inductive element.

5. The system according to claim 4, wherein each conductive element has an open loop shape.

6. The system according to claim 4, wherein each conductive element is obtained with a track of conductive material with thickness of the order of tenths or hundredths of millimetre.

7. The system according to claim 1, wherein the primary circuit is incorporated in a first electronic device and the secondary circuit is incorporated in a second electronic device, and in which wherein the second electronic device and separate and movable with respect to the first electronic device.

8. The system according to claim 7, wherein the first electronic device comprises at least a primary processing module connected to the primary transceiver module and configured to exchange data in binary format therewith, and wherein the second electronic device comprises a secondary processing module connected to the secondary transceiver module and configured to exchange data in binary format therewith.

9. The system according to claim 7, wherein the first device comprises a primary communication channel connected to the primary transceiver module to exchange therewith data encoded according to the standard of the communication channel, and wherein the second electronic device comprises a secondary communication channel connected to the primary transceiver module to exchange therewith data encoded according to the standard of the communication channel, the primary communication channel and the secondary communication channel belonging to a same technology selected from: USB, I2C, SPI, PCI Express, HDMI, Display Port, Ethernet, CAN, LIN, Flexray or other standard communication bus.

10. Method for full duplex data exchange through the system according to claim 1, comprising:
   a) receiving, at the primary transmission module or at the secondary transceiving module, a first binary data to be transmitted to the secondary transmission module or to the primary transceiving module, respectively;
   b) receiving, at the primary transmission module or at the secondary transceiving module, a second binary data transmitted by the secondary transmission module or by the primary transceiving module, respectively, through the capacitive coupling between the primary transceiving armatures and the respective secondary transceiving armatures, and
   c) generating a multilevel signal having:
      i) a first value of voltage, if both the first binary data and the second binary data represent a logic value 0,
      ii) a second value of voltage, if both the first binary data and the second binary data represent different logic values, or
      iii) a third value of voltage, if both the first binary data and the second binary data represent a logic value 1.

* * * * *